United States Patent
Takeda

(10) Patent No.: US 8,893,576 B2
(45) Date of Patent: Nov. 25, 2014

(54) SUSPENDING ROBOT SYSTEM

(75) Inventor: Shigeru Takeda, Okazaki (JP)

(73) Assignee: Denso Wave Incorporated, Aichi-pref. (JP)

( * ) Notice: Subject to any disclaimer, the term of this patent is extended or adjusted under 35 U.S.C. 154(b) by 1383 days.

(21) Appl. No.: 12/289,743

(22) Filed: Nov. 3, 2008

(65) Prior Publication Data

US 2009/0126524 A1 May 21, 2009

(30) Foreign Application Priority Data

Nov. 15, 2007 (JP) .................. 2007-296799

(51) Int. Cl.
*B25J 17/00* (2006.01)
*B25J 9/02* (2006.01)

(52) U.S. Cl.
CPC ...................... *B25J 9/026* (2013.01)
USPC ....................................... 74/490.02

(58) Field of Classification Search
USPC ............... 74/490.01, 490.03, 490.04, 490.05; 144/144.41; 414/1, 728, 744.1; 901/15, 901/16

See application file for complete search history.

(56) References Cited

U.S. PATENT DOCUMENTS

| | | | | |
|---|---|---|---|---|
| 3,667,114 A | * | 6/1972 | Smith et al. | 483/5 |
| 4,229,641 A | * | 10/1980 | Ihara | 219/125.1 |
| 6,264,590 B1 | * | 7/2001 | Ferrari | 483/13 |
| 7,128,506 B2 | * | 10/2006 | Ferrari et al. | 409/201 |
| 7,185,412 B2 | * | 3/2007 | Penick et al. | 29/560 |

FOREIGN PATENT DOCUMENTS

| | | |
|---|---|---|
| EP | 1 604 788 A1 | 12/2005 |
| JP | U-2-51087 | 4/1990 |
| JP | A-5-169379 | 7/1993 |

OTHER PUBLICATIONS

Feb. 8, 2012 Office Action issued in Japanese Patent Application No. 2007-296799 (with English translation).
Nov. 9, 2012 Office Action issued in German Patent Application No. 10 2008 056 223.8 w/translation.

* cited by examiner

*Primary Examiner* — Vicky Johnson
(74) *Attorney, Agent, or Firm* — Oliff PLC

(57) ABSTRACT

In one of a pair of supporting pillars, a clearance is formed in a side of a moving space of a side of a main robot body. Then, when the main robot body stops in the position immediately near the supporting pillar and an arm is turned, the range in which the arm can turn is expanded without contacting the supporting pillar.

6 Claims, 5 Drawing Sheets

SUSPENDING ROBOT SYSTEM

CROSS-REFERENCE TO RELATED APPLICATION

This application is based on and claims the benefit of priority from earlier Japanese Patent Application No. 2007-296799 filed on Nov. 15, 2007, the description of which is incorporated herein by reference.

BACKGROUND OF THE INVENTION

1. Technical Field of the Invention

The present invention relates to a suspending robot system that supports a main robot body having a turning arm by suspended movably in both ways on a rail spanned between a pair of supporting pillars 2. Description of the Related Art As shown in Japanese Patent Application Laid-Open Publication No. 5-169379, for example, there is provided a suspending robot system having a pair of supporting pillars mounted on a mounting base installed on a floor, a rail spanned between the pair of supporting pillars, and a main robot body that is supported on the rail by suspending so that the main robot body becomes movable in both ways along with the rail.

In the suspending robot system with a turning arm, the arm collides with the supporting pillars when the main robot body moves to immediately near the starting position or terminal position of the supporting pillars.

For this reason, the suspending robot system has a problem that in the position near the supporting pillars, a feasible region of an operation is narrowed.

SUMMARY OF THE INVENTION

The present invention has been made in order to solve the issue described above, and has as its object to provide a suspending robot system that can expand a range in which an arm can turn at a position near a supporting pillar.

In the suspending robot system according to a first aspect, there is provided a suspending robot system comprising a pair of supporting pillars having a straight-line-shaped rail spanned therebetween, a base being suspended by the rail that moves both ways along with the rail in a moving space between the pair of supporting pillars, and a main robot body having an turnable arm disposed on the base.

In addition, a clearance is formed on at least one of the supporting pillars, and the clearance is formed on the side of the moving space.

Therefore, when the arm is turned, a range in which the arm can turn is expanded without contacting the supporting pillar.

In the suspending robot system according to a second aspect, the clearance formed on at least one of the supporting pillars has a shape of a triangle, and a longest side of the triangle shape is arranged to face the side of the moving space.

In the suspending robot system according to a third aspect, a lower end of the clearance is positioned at a maximum height position in a range lower than a lower end of the arm or a part which turns together with the arm.

In the suspending robot system according to a fourth aspect, a rib for reinforcement is formed on the side of one of the supporting pillars with the clearance facing the moving space.

DETAILED DESCRIPTION OF THE PREFERRED EMBODIMENTS

With reference to the accompanying drawings, hereinafter will be described a first embodiment of the present invention.

Figure 1:
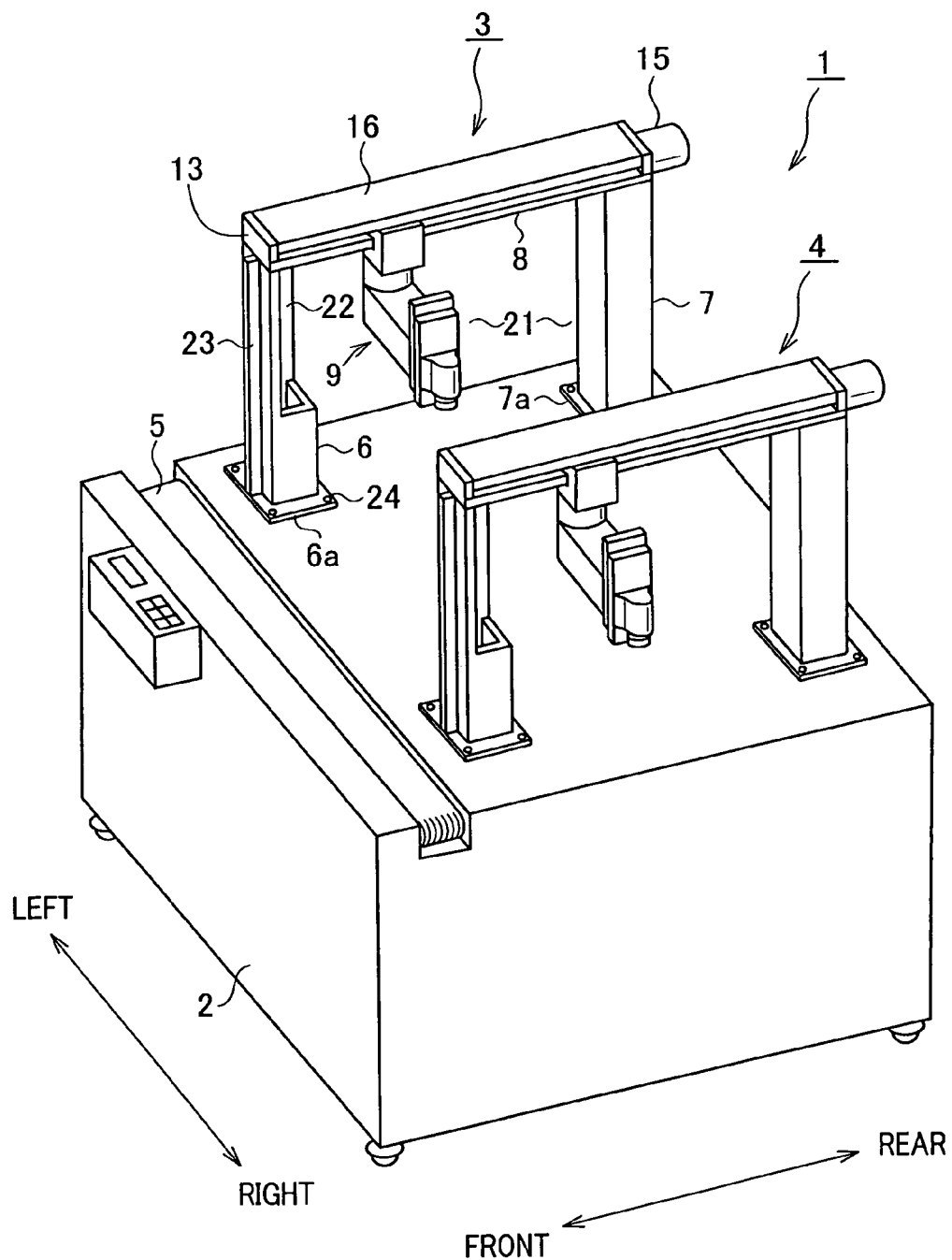
FIG. 1 is a perspective diagram showing an industrial robot device of a first embodiment according to the present invention.

FIG. 1 shows an industrial robot device. The front-rear direction of this FIG. 1 is the left-right direction of the industrial robot device.

In this industrial robot device 1, there are two robots 3 and 4, arranged side by side, disposed on a mounting base 2 installed on a floor.

A conveyor belt (a conveyance device) 5 that moves to left-right direction is disposed on the upper front side of the mounting base 2.

When the conveyor belt 5 moves a workpiece (not shown), the two robots 3 and 4 work consecutively on the workpiece, such as a processing of the workpiece or attaching parts to the workpiece.

Next, compositions of the two robots 3 and 4 are explained, however, since they have the same compositions, the composition of the robot 3 will be explained hereafter and the explanation of the robot 4 is omitted.

There is provided a pair of supporting pillars 6 and 7 on the mounting base 2 in the direction of front and rear and a rail 8 is spanned there between. The robot 3 is supported by suspending it by the rail 8 so that the robot 3 is able to move back and forth.

Figure 2:
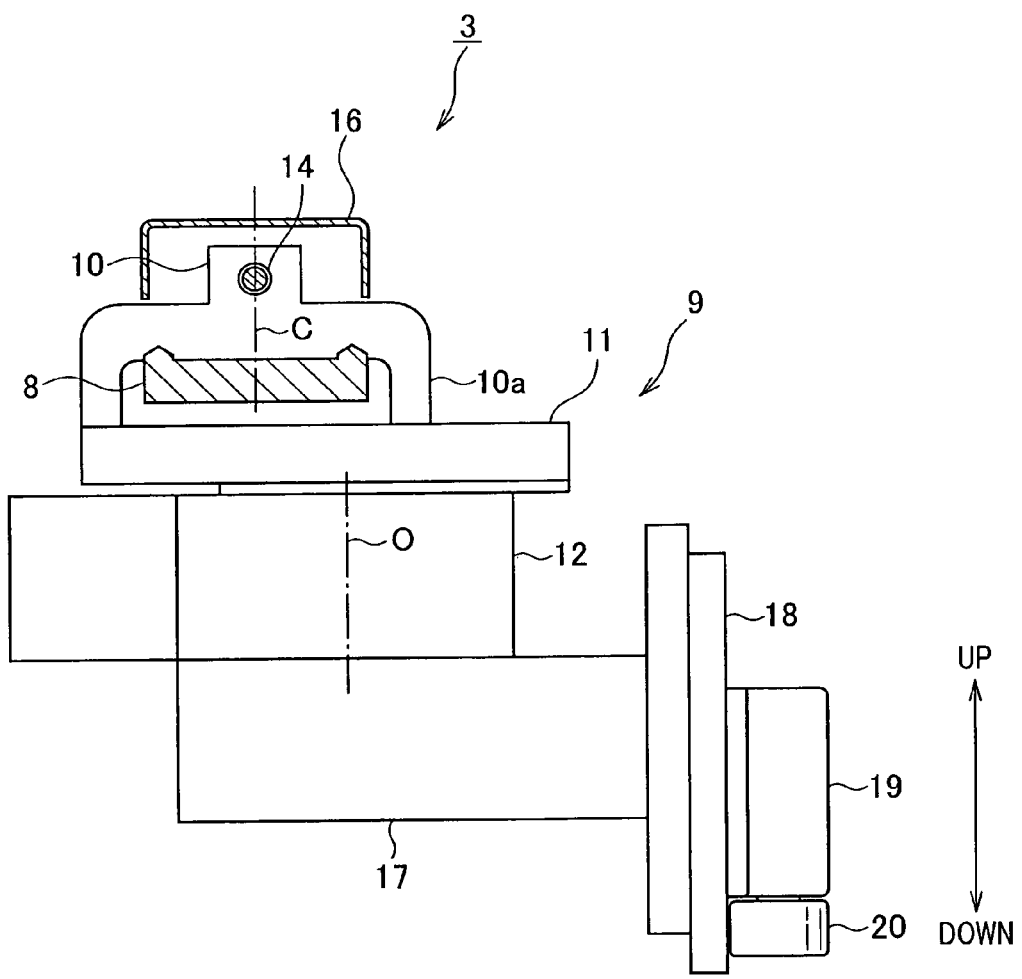
FIG. 2 is a vertical section elevational view showing the main robot body being supported by suspending by a rail.

That is, as shown in FIG. 2, the rail 8 movably in both-ways supports a movable body 10, and suspended parts 10a are formed in both the right and left sides of the movable body 10.

Moreover, a base plate 11 is fixed between the suspended parts 10a of the movable body 10, and a base 12 is attached to an undersurface of the base plate 11.

Therefore, the base 12 is in the state of being suspended to the rail 8 via the movable body 10, and is movable along with the rail 8 in both ways between the pair of supporting pillars 6 and 7.

Figure 3:
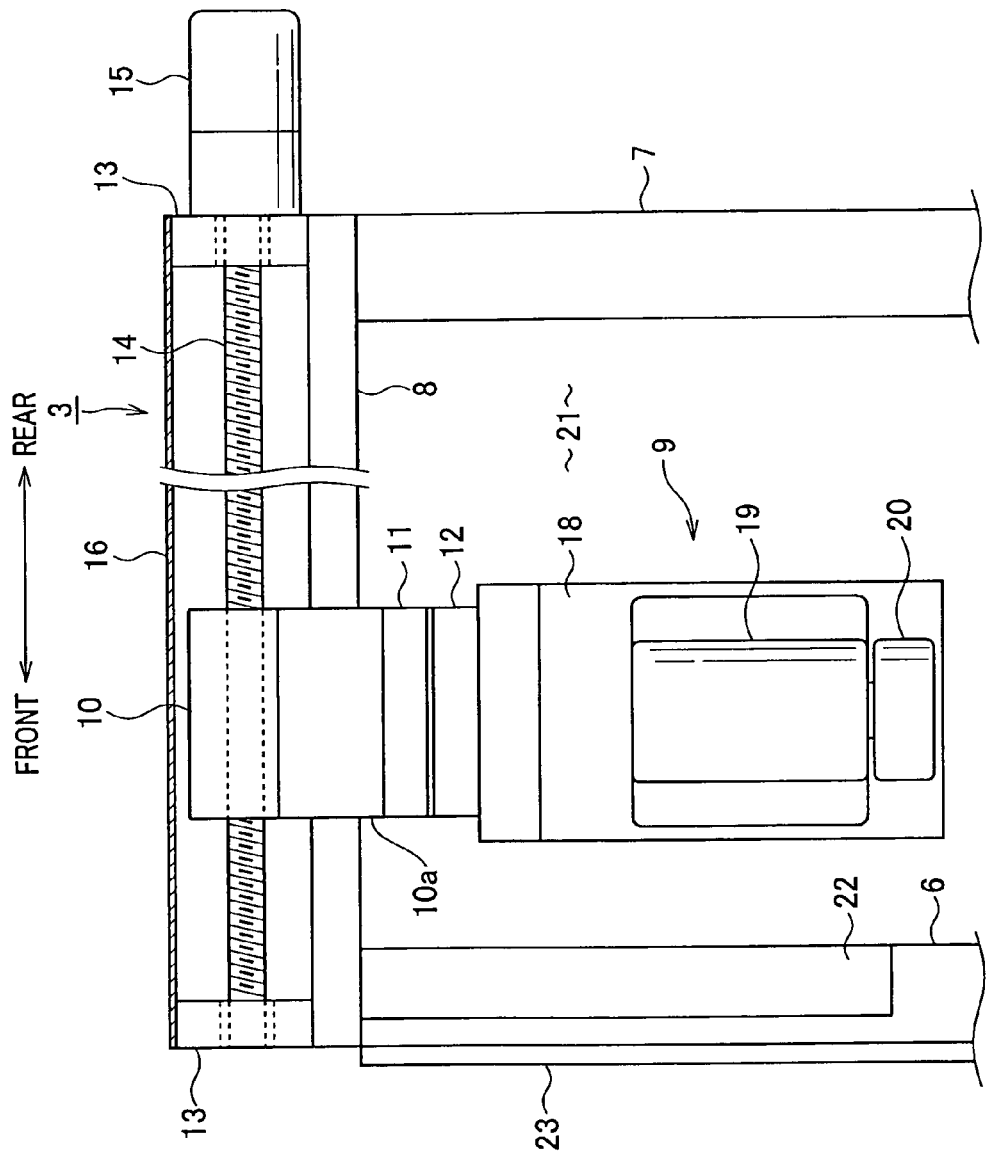
FIG. 3 is a vertical section side view showing the main robot body being supported by suspending by a rail.

As shown in FIG. 3, brackets 13 are fixed to both front and rear sides of the rail 8, and a screw shaft 14 of a ball screw mechanism (straight-moving mechanism) is rotatably supported between both the brackets 13.

The screw shaft 14 is screwed with the nut (not shown) of the ball screw mechanism fixed to the movable body 10. The screw shaft 14 is rotated in either direction by a motor 15 arranged on the rear bracket 13.

Further, the rotation of the screw shaft 14 moves the movable body 10, or the base 12 to the front or back according to the rotational direction of the screw shaft 14.

The screw shaft 14 is covered with a frame 16 attached between both the brackets 13.

Figure 4:
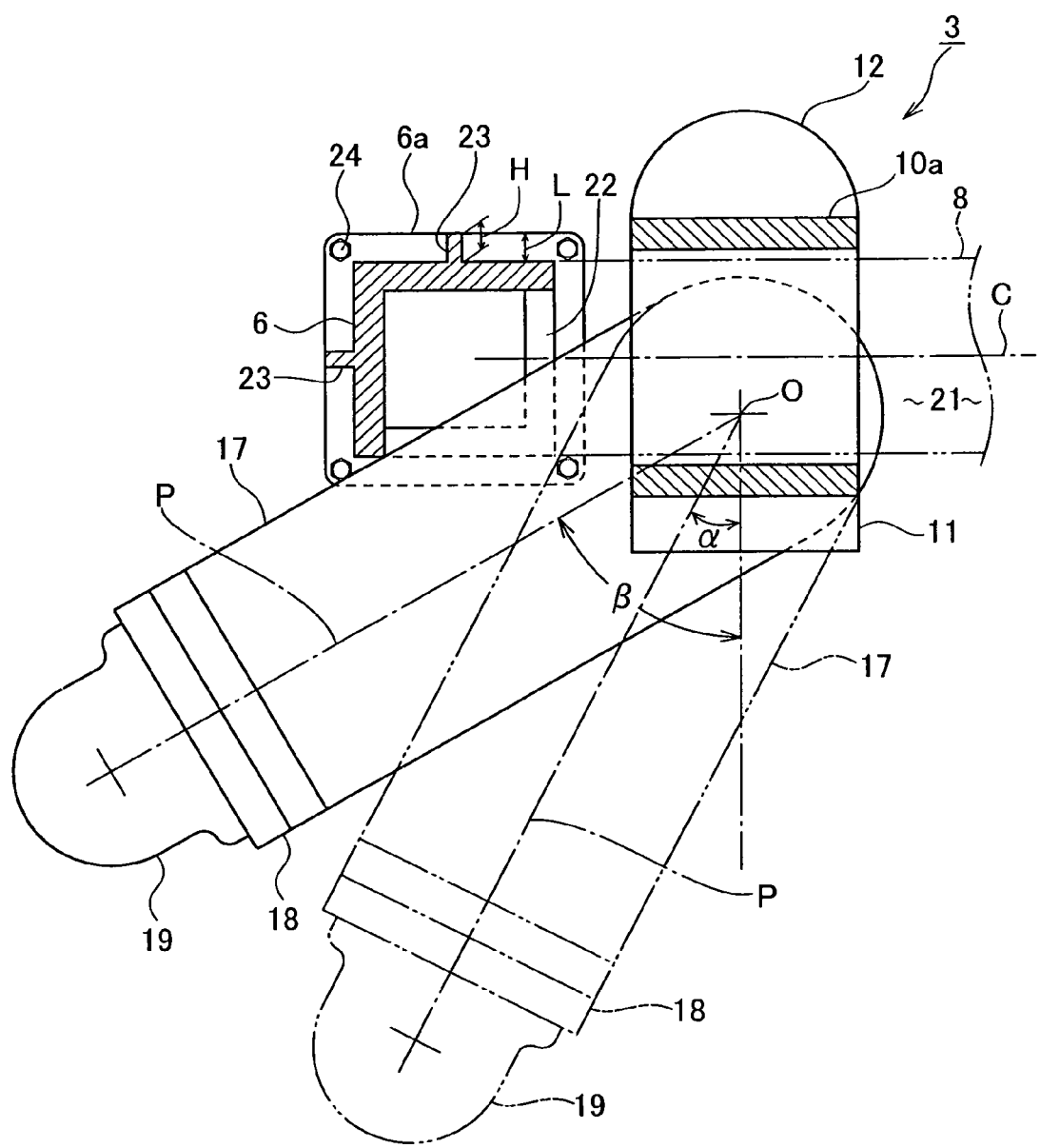
FIG. 4 is a crossing plane view showing a turning range of an arm at the time of a main robot body in a stopped state between supporting pillars.

An arm 17 is arranged turnable on a lower part of the base 12. The arm 17 is turnable horizontally in either direction by a motor (not shown) via a belt transmission mechanism (not shown) both disposed in the base 12. A center of turning O of the arm 17 is, as shown in FIG. 4, arranged off set to the side, to the right for example, of a centerline C in a width direction of the rail 8, in the state seen from the top.

The center of turning O of the arm 17 may be matched with the centerline C in the width direction of the rail 8.

An elevating board (an elevating body) 18 is supported movably in the direction of up and down at a tip part of the arm 17.

A motor (not shown) moves the elevating board 18 up and down via a pinion-rack mechanism (not shown) disposed in the arm 17.

A rotation-axis motor 19 is attached to the elevating board 18, and the wrist member 20 is attached to the lower end of an axis of the motor 19.

A chuck (not shown) is attached on the wrist member 20, and the chuck grasps tools for the workpiece or the attaching parts for the workpiece.

The main robot body 9 is constituted from the above-mentioned base 12, the arm 17, the elevating board 18, the motor 19 and the wrist member 20.

The main robot body 9 is arranged so that it moves both ways between a moving space 21 provided between the pair of the supporting pillars 6 and 7, while a starting position is set near to the front-supporting pillar 6 and a terminal position is set near to the rear-supporting pillar 7.

Although a 360-degree turning is possible for the arm 17, since the center of turning O of the arm 17 is arranged off set to the right of the centerline C in the width direction of the rail 8, a robot operation is entirely done on the right side of the rail 8.

Now, although the pair of supporting pillars 6 and 7 has hollow square shapes, a portion of the front support pillar 6 (one supporting pillar) is cut to form a clearance (named to "cutout portion 22" hereafter) in order to expand the operating area of the main robot body 9.

That is, since the operation of the main robot body 9 is entirely done on the right side of the rail 8 to the workpiece conveyed on the conveyor belt 5 as mentioned above, in order to expand the operating area by the side of the conveyor belt 5 of the arm 17 at the starting position, for example, where the main robot body 9 is near the front-supporting pillar 6, an upper portion of the front-supporting pillar 6 (one supporting pillar) at the side of the moving space 21 side, specifically a whole portion of a rear side surface (a wall) and a right side surface (a wall) that adjoins the rear side surface, which are the sides of the moving space 21 side, are cut.

Therefore, the sectional view of the upper portion of the supporting pillar 6 where the cutout portion 22 is formed becomes L-shaped.

The cutout portion 22 ranging from the rear side to the right side of the supporting pillar 6 is formed from an upper end of the supporting pillar 6 to the part below in the predetermined length.

The lower end of the cutout portion 22 is positioned, in this embodiment, at a maximum height position in a range lower than a lower end of the arm 17. Although the position of the lower end of the cutout portion 22 can be the same height position as the lower end of the arm 17 in order not to bar the lower end of the arm 17 to enter into the cutout portion 22, the lower end of the arm 17 may slidably touch the lower end of the cutout portion 22. Therefore the position is lowered only the minimum size necessary so that the lower end of the arm 17 does not slidably touch the lower end.

If a part turns together with the arm 17, the elevating board 18 for example, enters into the cutout portion 22, it is appropriate to position the lower end of the cutout portion 22 at a maximum height position in a range lower than a lower end of the elevating board 18.

By the way, forming the cutout portion 22 lowers strength of the supporting pillar 6. In order to supplement this strength reduction, ribs 23 for reinforcement are formed integrally on the front side surface and the left side surface of the supporting pillar 6. The ribs 23 extend from the bottom end to the upper end of the supporting pillar 6.

By the way the ribs 23 may be prepared separately and welded or etc. to the supporting pillar 6.

A projection height H of the rib 23 from the supporting pillar 6 is set equal or less to a projection length L of a rectangular attachment plate 6a provided at the bottom end of the supporting pillar 6 (H it is set to equal in this embodiment).

The attachment plate 6a is for fixing the supporting pillar 6 to the mounting base 2b, and four corners of the attachment plate 6a are fixed to the mounting base 2 by bolts 24.

The same kind of attachment plate 7a is provided also in the supporting pillar 7 on the rear side.

Now, as shown in FIG. 4, suppose the arm 17 is turned clockwise to the direction of the conveyor belt 5 side in the state where the base 12 is stopped in the starting position immediately near the supporting pillar 6.

In this case, suppose the cutout portion 22 is not formed on the supporting pillar 6, the marginal position of the turn of the arm 17 in clockwise is, as shown in FIG. 4 with a double dotted-dash line, a line that intersects perpendicularly with the centerline C in the width direction of the rail 8 and positions where a base line P passes through the center of turning O that turns α degrees.

That is, it is a position just before the arm 17 contacts a corner part on the right-hand side of the rear surface portion of the supporting pillar 6 (a lower right corner part in FIG. 4).

In the present embodiment, however, since the cutout portion 22 is formed on the supporting pillar 6, the arm 17 can turn β degree (β>α) to a position just before contacting the front wall (a left-hand side wall in FIG. 4) of the supporting pillar 6, as shown in FIG. 4 with a solid line, and the turning range of the arm 17 can be expanded and widen the operating area of the main robot body 9.

Further, since the ribs 23 are formed on the front-supporting pillar 6 in the present embodiment, the strength reduction by having the cutout portion 22 can be stopped to the minimum, and it can avoid producing a practical problem.

Figure 5:
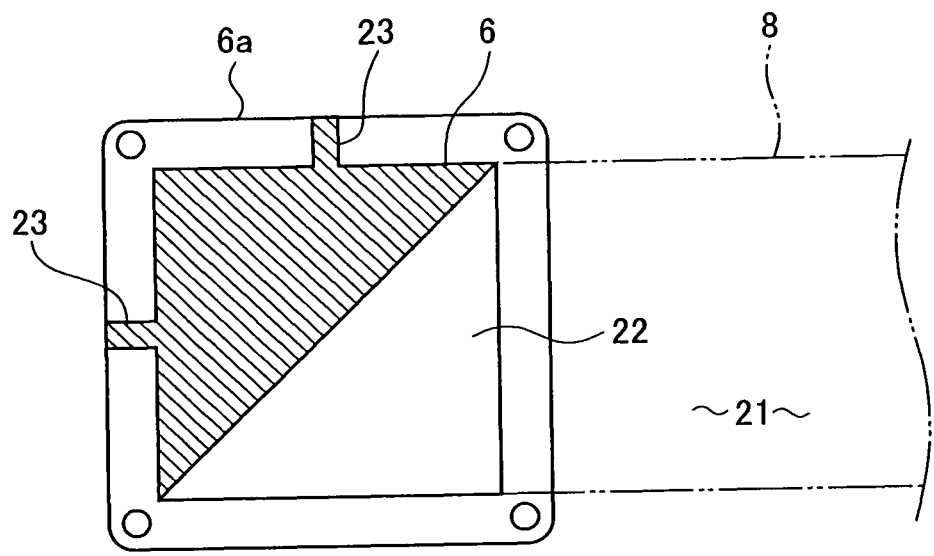
FIG. 5 is a second embodiment of the present invention, illustrating a crossing plane view of the supporting pillar in the front.

FIG. 5 shows the second embodiment of the present invention, and the difference between the first embodiment of the above and the second embodiment is that the front-supporting pillar 6 is made solid instead of hollow.

To the solid supporting pillar 6, the cutout portion 22 is formed in the shape of a triangle; for example, by cutting the supporting pillar 6 from the left part of the back side to the front part of the right side so that a quantity of the cut increases gradually.

Figure 6:
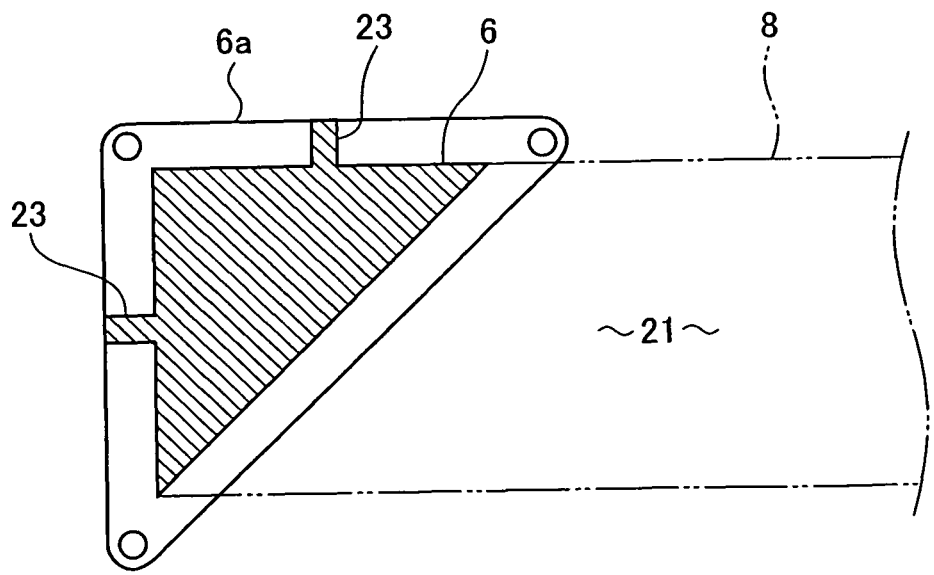
FIG. 6 is a third embodiment of the present invention, illustrating a crossing plane view of the supporting pillar in the front.

FIG. 6 shows the third embodiment of the present invention, and in this embodiment, the supporting pillar 6 is formed in the shape of a triangle from the bottom to the top. In addition, the supporting pillar 6 is fixes to the mounting base 2 so that a sloped side, which is the longest side of all, faces the side of the moving space 21 and inclines to the moving direction of the main robot body 9.

Consequently, of all the sides of the supporting pillar 6, the side facing the moving space 21 inclines in order not to become obstructive to the turning of the arm 17, the turning range of the arm 17 in the position near the supporting pillar 6 can be expanded.

This invention is not limited to the above-mentioned embodiments, however, and various implementations of modifications are possible within the limits of the essential points of the present invention.

If the turning range of the arm 17 in the position near the rear-supporting pillar 7 is needed to be expanded, what is necessary is to form another cutout portion on the rear-supporting pillar 7.

The number of the rib 23 is not limited to only one, but two or more may be accepted.

The section form of the rib 23 is not limited to a rectangle, but can consider various forms, such as a semicircle form.

What is claimed is:

1. A suspending robot system comprising:
   a pair of supporting pillars having a straight-line-shaped rail spanned therebetween;
   a base suspended by the rail, the base moving both ways along the rail in a moving space between the pair of supporting pillars; and
   a main robot body having a turnable arm disposed on the base, wherein
      at least one of the pair of supporting pillars has a clearance on a side of the moving space,
      the at least one supporting pillar having the clearance has four side surfaces, and
      the clearance has a triangle shape, a longest side of the triangle shape being arranged to face the side of the moving space, and the clearance is defined by a removed portion in (1) a part of a first side surface, of the four side surfaces, facing the moving space and (2) a part of a second side surface, of the four side surfaces, adjacent to the first side surface and facing a rotating axis of the turnable arm.

2. A suspending robot system of claim 1,
   a lower end of the clearance is positioned at a maximum height position in a range lower than a lower end of the turnable arm or of a part that turns together with the turnable arm.

3. A suspending robot system of claim 2,
   a rib for reinforcement is formed on a side of the at least one supporting pillar with the clearance facing the moving space.

4. A suspending robot system of claim 1,
   a rib for reinforcement is formed on a side of the at least one supporting pillar with the clearance facing the moving space.

5. A suspending robot system of claim 1, wherein the at least one supporting pillar having the clearance includes:
   a first portion that includes the clearance; and
   a second portion that does not include the clearance, wherein
   a cross-sectional area of the first portion is smaller than a cross-sectional area of the second portion.

6. A suspending robot system of claim 5, wherein the second portion is disposed below the first portion.

\* \* \* \* \*